United States Patent
Kumano et al.

(10) Patent No.: US 7,835,266 B2
(45) Date of Patent: Nov. 16, 2010

(54) NODE APPARATUS AND MAINTENANCE AND OPERATION SUPPORTING DEVICE

(75) Inventors: Satoshi Kumano, Kawasaki (JP); Yoshiyasu Sutou, Kawasaki (JP); Toshiyuki Yada, Kawasaki (JP); Kiyofumi Hara, Kawasaki (JP); Tomoyuki Abe, Kawasaki (JP); Michiko Suzuki, Kawasaki (JP); Kenichiro Ogi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1200 days.

(21) Appl. No.: 11/066,568

(22) Filed: Feb. 28, 2005

(65) Prior Publication Data

US 2005/0220006 A1   Oct. 6, 2005

Related U.S. Application Data

(63) Continuation of application No. PCT/JP02/11205, filed on Oct. 29, 2002.

(51) Int. Cl.
*G01R 31/08* (2006.01)
(52) U.S. Cl. ........................ 370/216; 370/217; 370/218; 370/535; 370/536; 370/542
(58) Field of Classification Search ......... 370/535–542, 370/216–228
See application file for complete search history.

(56) References Cited

U.S. PATENT DOCUMENTS

| | | | | |
|---|---|---|---|---|
| 5,278,824 A * | 1/1994 | Kremer | ....................... | 370/223 |
| 5,365,521 A * | 11/1994 | Ohnishi et al. | ............... | 370/352 |
| 5,568,475 A * | 10/1996 | Doshi et al. | ................... | 370/399 |
| 5,727,051 A * | 3/1998 | Holender | ............... | 379/112.05 |
| 5,920,412 A * | 7/1999 | Chang | ........................ | 398/83 |
| 5,970,067 A * | 10/1999 | Sathe et al. | ................... | 370/394 |
| 6,041,037 A * | 3/2000 | Nishio et al. | ................. | 370/228 |
| 6,058,419 A | 5/2000 | Taniguchi | | |
| 6,084,882 A * | 7/2000 | Ogura et al. | ................. | 370/409 |
| 6,188,671 B1 * | 2/2001 | Chase et al. | ................. | 370/232 |
| 6,498,794 B1 * | 12/2002 | Tsukamoto et al. | ....... | 370/395.1 |
| 6,532,088 B1 * | 3/2003 | Dantu et al. | ................... | 398/43 |
| 6,665,295 B1 * | 12/2003 | Burns et al. | .................. | 370/389 |
| 6,697,329 B1 * | 2/2004 | McAllister et al. | ........... | 370/235 |
| 6,704,327 B1 * | 3/2004 | Gardner et al. | ............... | 370/467 |
| 7,016,379 B2 * | 3/2006 | Falkenstein et al. | .......... | 370/535 |
| 7,130,262 B1 * | 10/2006 | Cortez et al. | ................. | 370/216 |

(Continued)

FOREIGN PATENT DOCUMENTS

JP      2000-341309      12/2000

(Continued)

*Primary Examiner*—Ayaz R Sheikh
*Assistant Examiner*—Andrew C Lee
(74) *Attorney, Agent, or Firm*—Staas & Halsey LLP

(57) ABSTRACT

The present invention relates a node device cross-connected to a STM transmission system and a maintenance and operation support device connected to the node device. The object of the present invention is to releasing a desired transmission section or link efficiently. Therefore, the node device according to the preset invention includes control section individually selecting a link provided to for a path in the communication devices accommodated into the local and remote stations; and cross-connection section providing a path through the selected link, wherein the control section selects an auxiliary link based on a system configuration when identifiers of all paths to be replaced by the substitute path are given.

2 Claims, 9 Drawing Sheets

U.S. PATENT DOCUMENTS

| | | | |
|---|---|---|---|
| 7,161,944 B1 * | 1/2007 | Hillard et al. | 370/397 |
| 7,334,047 B1 * | 2/2008 | Pillay-Esnault | 709/242 |
| 7,426,179 B1 * | 9/2008 | Harshavardhana et al. | 370/219 |
| 2001/0019536 A1 * | 9/2001 | Suzuki | 370/226 |
| 2002/0018447 A1 * | 2/2002 | Yamada et al. | 370/252 |
| 2002/0064166 A1 * | 5/2002 | Suetsugu et al. | 370/403 |
| 2003/0072268 A1 * | 4/2003 | Nishimura et al. | 370/252 |
| 2003/0095500 A1 * | 5/2003 | Cao | 370/216 |
| 2003/0123440 A1 * | 7/2003 | Sakurai et al. | 370/391 |
| 2003/0189920 A1 * | 10/2003 | Erami et al. | 370/351 |
| 2004/0081167 A1 * | 4/2004 | Hassan-Ali et al. | 370/395.42 |

FOREIGN PATENT DOCUMENTS

| | | |
|---|---|---|
| JP | 2001-156821 | 6/2001 |

* cited by examiner

F I G. 7
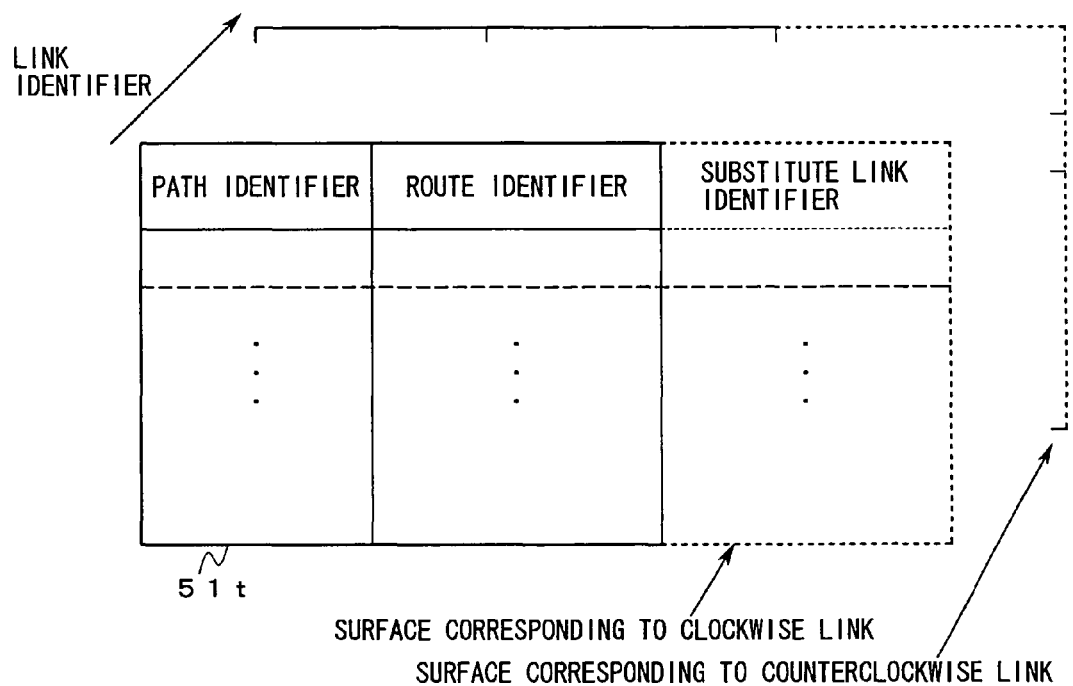

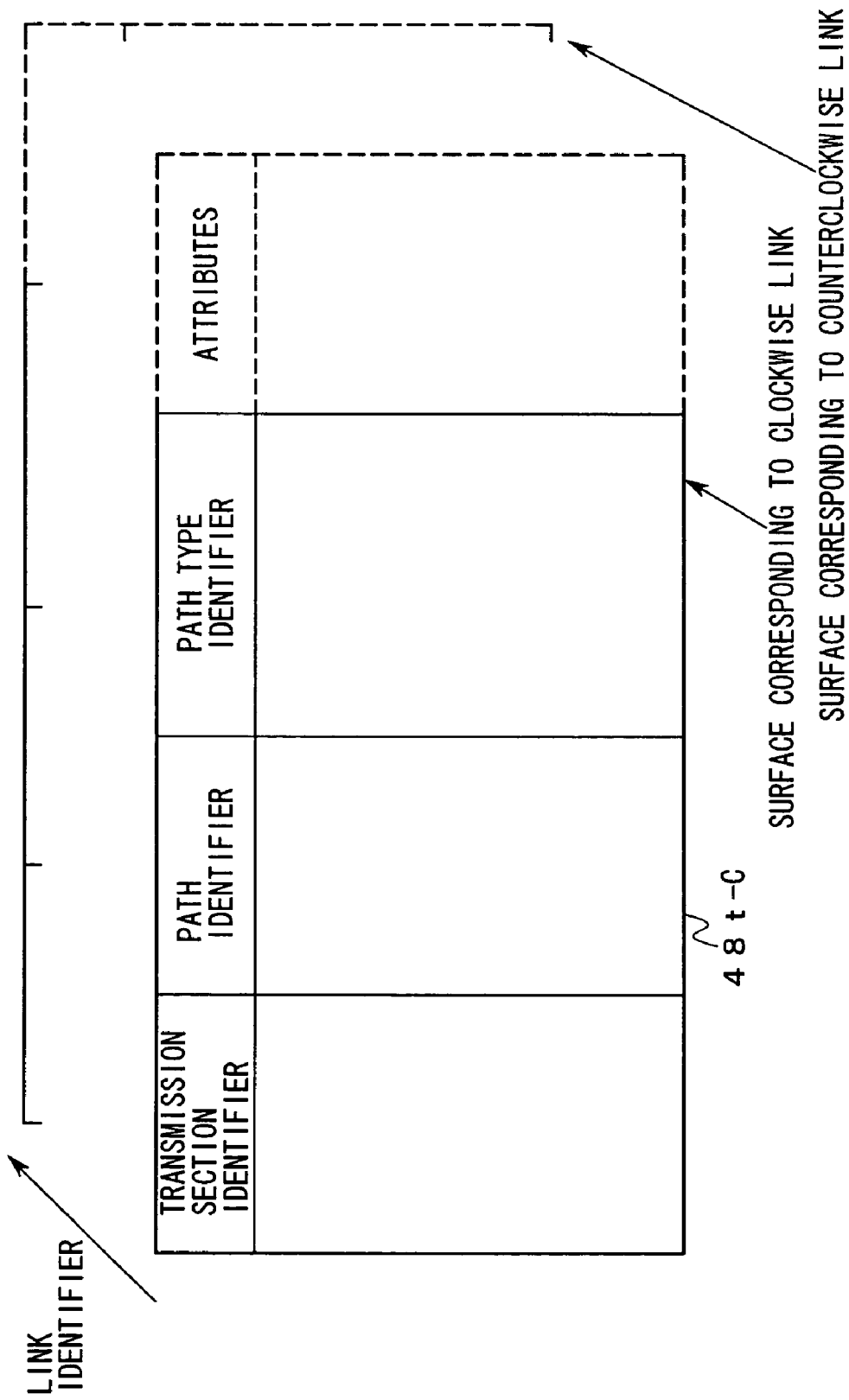

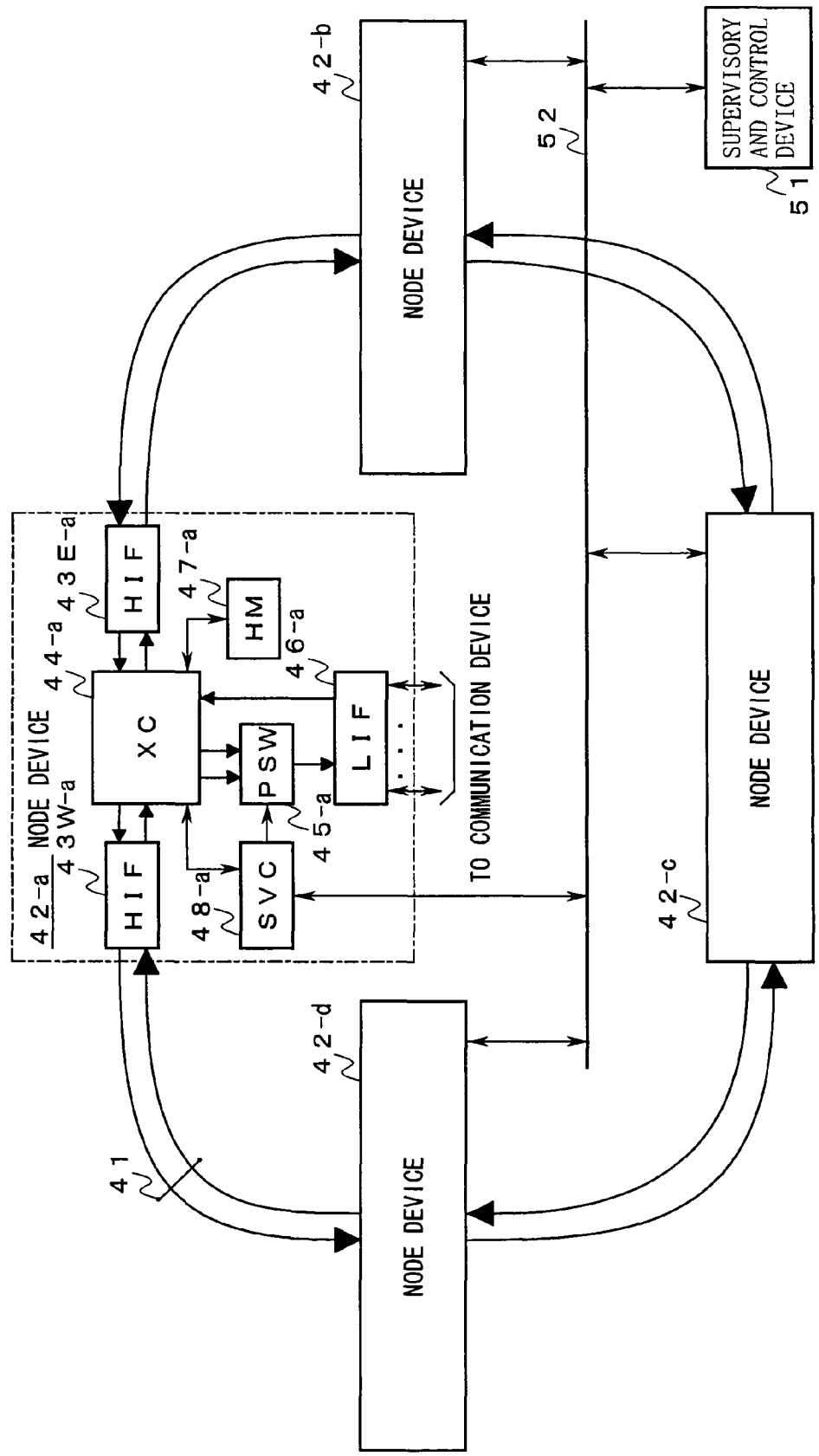

NODE APPARATUS AND MAINTENANCE AND OPERATION SUPPORTING DEVICE

CROSS-REFERENCE TO RELATED APPLICATIONS

This application is a continuation of PCT International Patent Application No. PCT/JP02/11205, filed on Oct. 29, 2002, the entire contents of which are incorporated herein by reference.

BACKGROUND OF THE INVENTION

1. Field of the Invention

The present invention relates to a node device arranged at every transmission section for cross-connection in a transmission system adapted to a synchronized transmission mode and a maintenance and operation supporting device linked with the node device for maintaining a link and a path based on the cross-connection.

2. Description of the Related Art

With a novel synchronous digital hierarchy (SDH), it is possible to achieve synchronization of various signals including a low rate group and a high rate group, flexible edition of transmission information for the high rate group as well as supervisory, inspection and control in connection with various maintenance and operation in the transmission path, so that the SDH has been widely used in not only a trunk line system such as B-ISDN but also a private network.

FIG. 9 is a diagram showing a network configuration applied to the novel synchronous digital hierarchy.

In FIG. 9, a plurality of node devices 42-a to 42-d are arranged in a network 41 formed in a ring type as a unidirectional path switched ring (UPSR) and duplexed based on an active redundancy, and these node devices 42a to 42d are connected to a supervisory and control device 51 via a LAN 52.

Among these node devices 42-a to 42-d, the node devices 42a include the following elements:

- a plurality of high-speed interface (HIF) units 43W-a and 43E-a respectively connected to two transmission sections immediately next to the network 41;
- a cross-connector (XC) unit 44-a arranged between the afore-mentioned high-speed interface units 43W-a and 43E-a;
- a path switch (PSW) 45-a cascade-connected to two low-speed outputs of the cross-connector unit 44-a corresponding to the afore-mentioned high-speed interface units 43W-a and 43E-a, respectively;
- a low-speed interface unit (LIF) 46-a interfacing between an output of the path switch 45-a and a low-speed input of the cross-connector unit 44-a to each of communication devices (not shown) accommodated into the node device 42-a;
- a storage memory (HM) 47-a connected to a control termination of one side of the cross-connector unit 44-a; and
- a supervisory and control unit 48-a connected to a control termination of the other side of the cross-connector unit 44-a and the control termination of the path switch 45-a, or connected to the LAN 52.

The node devices 42-b to 42-d have the basically same construction as that of the node device 42-a, so that identical reference numbers with additional characters 'b' to 'd' instead of 'a' refer to like parts which have the similar function and structure. The detailed description thereof will be omitted herein.

In the network constructed as described above, the respective node devices 42-a to 42-d linked as mentioned below are cross-connected in predetermined rate group units (e.g., a path having a transmission rate of 52 Mbps) so that a predetermined path is provided in the communication device accommodated into the node devices 42-a to 42-d through the network 41.

Hereinafter, an additional character 'C' which represent any one of the additional characters 'a' to 'd' refers to the common characteristics that can be applied into any of the node devices 42-a to 42-d.

In addition, hereinafter, for any of the transmission section provided between the node devices 42-a to 42-d, additional characters indicating two nodes arranged at both sides of the corresponding transmission section will be individually attached (e.g., additional character 'ab' refers to a transmission section from the node device 42-a to the node device 42-b).

The storage memory 47-C stores control information on paths provided between the preceding and following transmission sections of the network 41 and between the communication device accommodated into the node device 42-C and either one of the transmission sections, as station information (including station information updated by the supervisory and control unit 48-C).

The cross-connector unit 44-C provides all paths indicating station information between the preceding and following transmission sections of the network 41, and between the communication device accommodated into the node device 42-C and either one of the transmission sections.

In addition, the path switch 45-C selects a low-speed output corresponding to the path to be individually connected to the communication device (corresponding to one of the input side between the two adjacent transmission sections) among the low-speed outputs of the cross connector unit 44-C, under the control of the supervisory and control unit 48, and connects the selected low-speed output to the low-speed interface unit 46-C.

In addition, while in maintenance and operation, for example, when the transmission sections ab is to be released due to extension of node installation or inspection subject, each unit is connected as described below.

The supervisory and control device 51 totally manages an active path provided through any one of the transmission sections ab, bc, cd, da, ad, dc, cb, and ba and an auxiliary path prepared in advance within a redundant transmission capacity of the respective transmission sections to be used in place of the active path.

When an operator assigns the transmission section ab as a transmission section to be released, the supervisory and control device 51 specifies all of the paths (hereinafter, referred to as a specific path, individually) provided via the transmission section ab.

Under the afore-mentioned control, the supervisory and control device 51 specifies an auxiliary path that can individually substitute the specific path, and informs the operator of an identifier of the corresponding specific path and identifiers of node devices arranged at both ends of the specific path, for either of the auxiliary path, based on a predetermined man machine interface.

Furthermore, when either end of the specific path is assigned by the operator, the supervisory and control device 51 updates system configuration information in connection with the corresponding specific path (and provided to the afore-mentioned control) and transmits a 'switching instruction' comprising identifiers of the specific path and auxiliary path to the two node device destinations arranged at both ends of the corresponding auxiliary paths through the LAN 52.

The supervisory and control unit 48-C that can be individually arranged in the afore-mentioned two node devices of the node devices 42-*a* to 42-*d* instructs the path switch unit 45-C to replace the specific path indicated by the identifiers included in the 'switching instruction' by the auxiliary path.

However, in the example of the prior art, the 'switching instruction' is not transmitted to any of the node device destinations as long as the operator does not assign the specific path, and transmitted to two node device destinations arranged at both ends of the specific path for every specific path assigned by the operator.

Therefore, when the transmission section ab is released due to the extension of the node installation or the inspection subject, manual tasks should be performed many times (the maximum counts will be '192' that is equal to the number of rate groups to be cross-connected at every bit rate of 52 Mbit/sec in case of the rate group having a bit rate of 10 Gbyte/sec), and thus, to exactly assign every path without missing, a man machine interface should be provided with which 'proper information concerning the actual system configuration' can be precisely provided to the operator and fault operation is accurately prevented.

However, in the rate group of the transmission section to be cross-connected, in particular, in the network of the trunk line system, there is a high probability that increasing demand on transmission service of the data system may lead to shifting of much higher rate group, so that there is a strong demand for technology in which the man hour that takes to release the desired transmission section can be increased and degradation of certainty regarding the releasing can be significantly reduced.

SUMMARY OF THE INVENTION

Accordingly, it is an object of the present invention to provide a node device and a maintenance and operation support device capable of efficiently releasing a desired transmission section or link, without a significant change of a basic configuration.

According to the present invention, transmission quality and service quality of a transmission system can be maintained high without degrading the overall reliability.

In addition, according to the present invention, a link having a path to be replaced by another path, when required, can be efficiently and surely released.

In addition, according to the present invention, release in a desired transmission section is satisfactorily and surely performed.

In addition, according to the present invention, even when a plurality of or a number of active links are provided in any one of the links, provided that the afore-mentioned auxiliary link is assigned in the system configuration, the link having a path as described above can be efficiently and surely released.

In addition, according to the present invention, irrespective of a rate group of the individual links, the number of paths to be replaced in response to the afore-mentioned demands, and the configuration type of a physical link is redundant, even when a plurality of or a number of active links are provided in any one of the links, the link having a path as described above can be efficiently and surely released.

In addition, according to the present invention, with a demand having a priority over the maintenance and operation, stability of the specific transmission section or link released in response to the demand can be ensured.

In addition, according to the present invention, compared to a case where a dedicated communication link should be established between an instruction transmitting end and a relaying end, a simple configuration can be achieved along with improved reliability and low costs manufacturing.

In addition, according to the present invention, a geographical restriction of the site in which supervisory and control task for maintenance and operation is performed is relieved, so that various types of maintenance and operation can be flexibly applied.

In addition, according to the present invention, a simple configuration can be achieved along with improved reliability and low costs manufacturing.

In addition, according to the present invention, compared to the prior art, a task of releasing a desired transmission section or link can be done efficiently and with less effort.

In addition, according to the present invention, a traffic increase accompanied by the afore-mentioned instruction distribution can be relieved, irrespective of the number of transmission sections or links to be released and the types thereof.

In addition, according to the present invention, operation related to assigning a link or transmission section to be released is simplified while the maintenance and operation task can be done efficiently.

In addition, according to the present invention, in addition to the flexible adaptability to various types of maintenance and operation tasks, these tasks can be efficiently performed.

To achieve the afore-mentioned objects, it is provided a node device characterized by selecting an auxiliary link in which the substitute path is individually provided, based on a path duplication scheme of an appropriate system configuration, when an instruction including identifiers of all paths to be replaced by substitute paths, respectively, is provided from the outside.

In the node device, every path specified from the outside is provided to the auxiliary link assigned under the appropriate system configuration, using the afore-mentioned duplication scheme, even when the substitute link where another path should replace the path is not assigned.

Therefore, even with the high-rate group in the link or a lot of paths to be replaced in response to the afore-mentioned demands, the link into which the path is provided will be efficiently released with high efficiency.

The afore-mentioned objects are achieved by a node device characterized by prioritizing substitute links, when an instruction including identifiers of all paths to be replaced by other paths and identifiers of the substitute links into which the replaced paths are provided are given from outside.

In the node device, all paths that should be replaced in response to maintenance, operation, and other request are collectively assigned from the outside, so that the substitute paths can be provided to the substitute link where the paths are replaced.

Therefore, even with redundant construction irrespective of types of the physical links, the link provided with the afore-mentioned path can be efficiently and surely released, provided that the afore-mentioned substitute link is assigned under the system configuration.

The afore-mentioned objects are achieved by a node device characterized in that all paths provided in the specific transmission section are paths indicated by identifiers included in the instruction and to be provided to the substitute link.

In the above node device, every path provided in the afore-mentioned specific transmission section is replaced by another path provided in the substitute link that does not include the specific transmission section.

Therefore, the desired transmission section can be smoothly and surely released.

To achieve the afore-mentioned objects, it is also provided with a node device characterized by selecting an auxiliary link to be individually provided to all paths indicated by registered identifiers corresponding to the collection, based on the appropriate system configuration of link duplication scheme, when an instruction indicating a collection of link identifiers to be released is given from the outside.

In the node device, all paths corresponding to start and end points and to be replaced in response to maintenance, operation and other requests and auxiliary links into which substitute paths are to be provided are collectively assigned, or independently selected based on a row of identifiers of the links where the paths are provided, and a system configuration appropriate to the afore-mentioned duplication scheme.

Therefore, even when a plurality of or a number of active links are provided in any of the links, the link having the path can be efficiently and surely released, provided that the afore-mentioned auxiliary links are assigned under the system configuration.

To achieve the afore-mentioned objects, it is also provided with a node device characterized by specifying every link and every path indicated as a registered identifier corresponding to a collection, when an instruction indicating a collection of identifiers of links to be released is given from the outside, and prioritizing the substitute link for every path.

In the node device, all paths corresponding to start and end points and to be replaced in response to maintenance, operation and other requests and auxiliary links into which substitute paths are to be provided are collectively assigned from the outside and independently selected based on a row of identifiers of the links where the paths are provided.

Therefore, even when a plurality of or a number of active links are provided in any of the links, the link having the path can be efficiently and surely released.

To achieve the afore-mentioned objects, it is also provided with a node device characterized in that links to be released indicated by identifiers included in an instruction are "all links provided in the specific transmission section".

In the node device, all paths provided in the specific transmission section are replaced with other paths provided to the substitute links any of which does not include the specific transmission section.

Therefore, the desired transmission section can be efficiently and surely released.

To achieve the afore-mentioned objects, it is also provided with a node device characterized by deferring update of the path provided in the afore-mentioned selected link.

In the node device, every path provided to the substitute link to release the specific transmission section or link in response to maintenance, operation and other requests is maintained without replacing with another path formed in another link.

Therefore, giving the priority to the afore-mentioned maintenance, operation and other requests, the specific transmission section or link released in response to the request can be ensured stably.

To achieve the afore-mentioned objects, it is also provided with a node device characterized in that the instruction is given as information transferred through "redundant transmission bandwidth of the link provided in the preceding transmission section".

In the node device, it is ensured that the instruction is given even when the dedicated communication link is not established between the transmitting end and the relaying end of the instruction.

Therefore, compared to a case where the dedicated communication link should be established, a simple construction can be made along with improved reliability and low-cost manufacturing.

To achieve the afore-mentioned objects, it is also provided with a node device characterized in that the instruction is given as information transferred through "the specific communication link different from any of the preceding transmission section".

In the node device, it is ensured that the instruction is given through the specific communication link as mentioned above even when the transmitting end and the relaying end of the instruction does not exist in a region where the existing link is established.

Therefore, various types of maintenance and operation can be flexibly applied.

To achieve the afore-mentioned objects, it is also provided with a node device characterized by relaying an instruction including an identifier of the node device corresponding to the destination of the instruction and whose destination does not correspond to the local station, through a redundant transmission bandwidth of the following transmission section.

In the node device, the afore-mentioned instruction is transferred to other node that is a destination of the instruction, by using the redundant transmission bandwidth of the link to be cross-connected.

Therefore, a simple construction can be made with improved reliability and low-cost manufacturing.

To achieve the afore-mentioned objects, it is also provided with a maintenance and operation support device characterized in that instructions including registered paths and the node are collectively distributed to the respective nodes predetermined in response to the assigned link.

With the maintenance and operation support device, the substitute paths in place of the corresponding paths can be collectively informed, for the respective nodes arranged at both ends of all paths provided in the afore-mentioned assigned link.

Therefore, compared to the prior art, the task for releasing of the desired transmission section or link can be efficiently done with less effort.

To achieve the afore-mentioned objects, it is also provided with a maintenance and operation support device characterized in that instructions including the substitute links and registered paths in addition to the nodes are collectively distributed to the respective nodes predetermined corresponding to the assigned link.

With the maintenance and operation support device, a substitute link into which all of the corresponding paths and the substitute paths in place of the corresponding paths are to be provided can be collectively informed, for the respective nodes arranged at both ends of all paths provided in the afore-mentioned assigned link.

Therefore, compared to the prior art, the task for releasing of the desired transmission section or link can be efficiently done with less effort.

To achieve the afore-mentioned objects, it is also provided with a maintenance and operation support device characterized in that every link is a duplicated link.

With the maintenance and operation support device, it is not necessary to inform the link into which the substitute path in place of the corresponding path is to be provided, for any nodes arranged at both ends of the paths.

Therefore, irrespective of the number of the transmission section or link and the configuration thereof, increase traffic accompanied by the transmission of the afore-mentioned instruction can be relieved.

To achieve the afore-mentioned objects, it is also provided with a maintenance and operation support device characterized in that for every group suitable for a network configuration, the links included in the group are previously registered and are identified as links that release the all links registered corresponding to the group assigned from the outside.

With the maintenance and operation support device, the configuration of the link or transmission section to be released can be assigned as a single group from the outside provided that it is predetermined in the existing group.

Therefore, operation for assignment of the link or transmission sections is simplified so that a task for maintenance and operation can be done efficiently.

To achieve the afore-mentioned objects, it is also provided a maintenance and operation support device characterized in that the group has "a configuration of one or both of the transmission section and link to be a task subject related to the network maintenance and operation".

With the maintenance and operation support device, the configuration of the transmission section or the link to be the afore-mentioned task subject is surely informed to the associated node, without the complex task for the maintenance and operation.

Therefore, in addition to flexible adaptability over various types of tasks for the maintenance and operation, the task can be done efficiently.

BRIEF DESCRIPTION OF THE DRAWINGS

The nature, principle, and utility of the invention will become more apparent from the following description when read in conjunction with the accompanying drawings in which like parts are designated by identical reference numbers, in which:

FIG. 7 is a diagram showing a configuration of a path management table;

FIG. 8 is a diagram showing a configuration of a bandwidth management table; and FIG. 9 is a diagram showing an example of configuration of a network having a new synchronous interface.

DESCRIPTION OF THE PREFERRED EMBODIMENTS

First, a diagram showing a principle of a node device according to the present invention will be illustrated.

Figure 1:
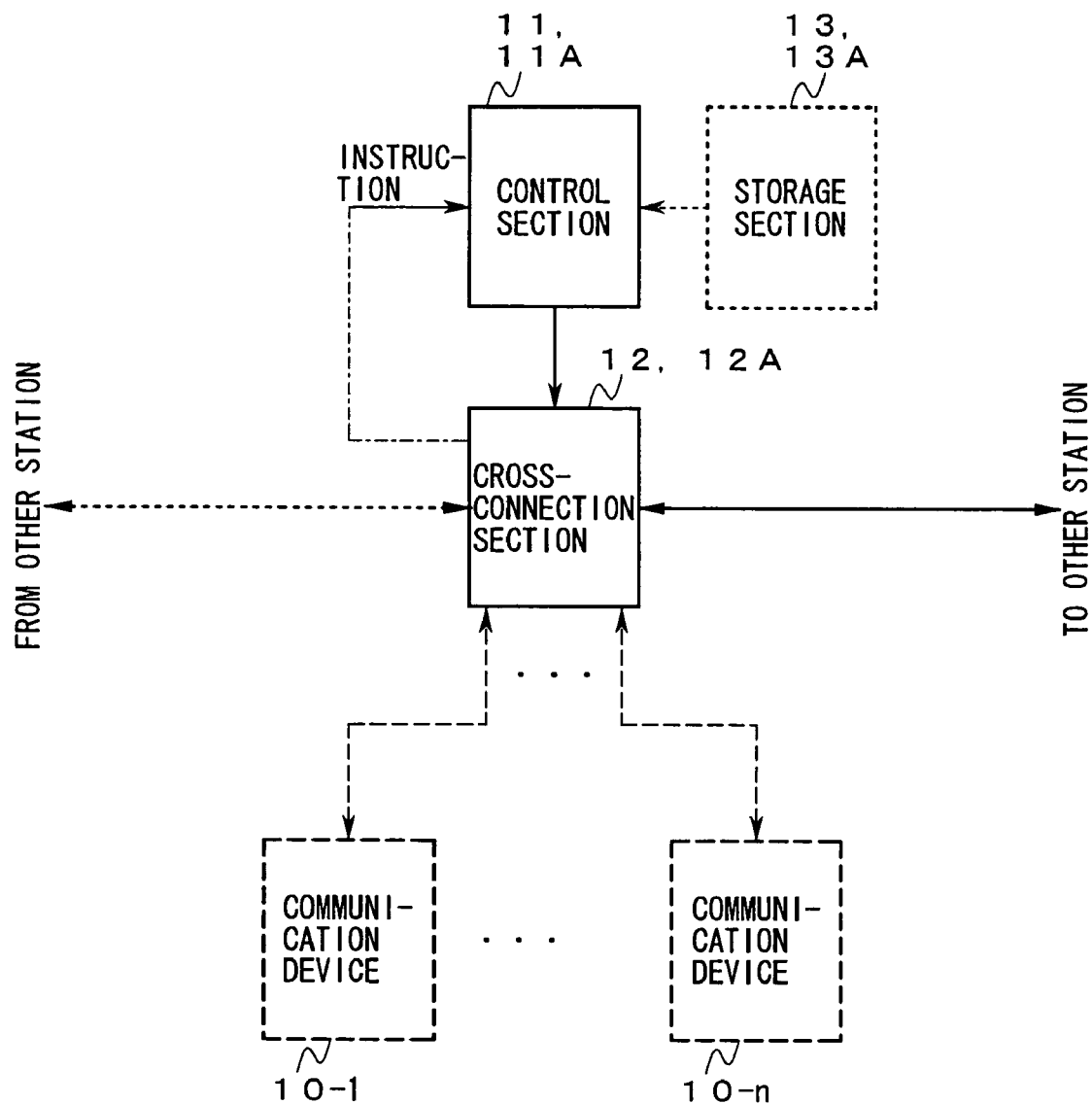
FIG. 1 is a block diagram showing a principle of a node device according to the present invention.

FIG. 1 is a block diagram showing a principle of a node device according to the present invention.

The node device shown in FIG. 1 includes control section 11 and 11A, cross-connection sections 12 and 12A, and storage sections 13 and 13A.

The first principle of the node device according to the present invention will be operated as follows. For all links duplicated and provided to form the respective paths between communication devices 10-1 to 10-*n* accommodated into a local station and communication devices accommodated into a remote station, the control section 11 select an active link in which the paths are to be provided, individually. The cross-connection section 12 provides a path between the communication devices 10-1 to 10-*n* and communication devices accommodated into the remote station through the active link selected by the control section 11 among all links. When an instruction including identifiers of all paths in which the substitute paths are to be provided is given from the outside, the control section 11 selects an auxiliary link on which the paths are to be individually provided, based on a proper system configuration in a duplication scheme.

In the node device, all paths collectively assigned from the outside for all paths to be replaced in response to the maintenance, operation and other requests are provided in an auxiliary link assigned under the appropriate system configuration in the afore-mentioned duplication scheme, even when substitute links in which the substitute paths are to be provided in place of the paths are not assigned.

Therefore, even when there is a high rate group of link, or there exist a lot of paths to be replaced in response to the afore-mentioned requirements, the link on which the paths are provided is efficiently and surely released.

The second principle aspect of the node device according to the present invention will be descried as follows.

The control section 11A individually selects a link on which the paths are to be provided, of all links provided to form respective paths between communication devices 10-1 to 10-*n* accommodated into a local station and communication devices accommodated into a remote station. The cross-connection section 12A provides a path between the communication devices 10-1 to 10-*n* and communications device s accommodated into a remote station through a link selected by the control section 11A, of all links. When an instruction including identifiers of all paths on which substitute paths are provided is given from the outside and a substitute link on which the substitute paths are to be provided, the control section 11A prioritizes the substitute link.

In the node device, the substitute paths are collectively assigned from the outside for all paths to be replaced in response to maintenance, operation and other requests and the substitute links on which paths are formed in replace of the above paths are provided.

Therefore, even when not only the rate group of the substitute link is high, or paths to be replaced by the substitute paths are not so many, but also various types of physical lines are redundantly provided, the link on which the path is provided can be efficiently and surely released, provided that the afore-mentioned substitute link is assigned under the system configuration of the substitute link.

The third principle of the node device according to the present invention will be described as follows.

The paths indicated by the identifier included in the instruction and to be provided on the substitute link are all paths provided in the specific transmission section.

In the node device, all paths provided in the specific transmission section are replaced with other paths provided on the substitute line not having the specific transmission section in either side.

Therefore, the desired transmission section can be smoothly and surely released.

The fourth aspect of the node device according to the present invention will be described as follows.

The control section 11 individually selects a link on which the paths are to be provided, of all links duplicated and provided to form respective paths between communication devices 10-1 to 10-*n* accommodated into a local station and communication devices accommodated into a remote station. The cross-connection section 12 provides a path between the communication devices 10-1 to 10-n and communication devices accommodated into a remote station through a link selected by the control section 11, of all links. The storage section 13 registers identifiers of all paths provided to a link belonging to a group, for every link to be released in parallel. When an instruction indicating a group of identifiers of the active links to be released is given from the outside, the control section 11 selects an auxiliary link indicated by the identifier registered in the storage section 13 corresponding to the group, on which all paths are provided respectively, based on the appropriate system configuration in a duplication scheme.

In the node device, all paths corresponding to start and end points and to be replaced in response to maintenance, operation and other requests and auxiliary links into which substitute paths are to be provided are collectively assigned from the outside, or independently selected based on a row of identifiers of the links where the paths are provided, and a system configuration appropriate to a duplication scheme.

Therefore, irrespective of the number of paths to be replaced by the respective rate group of the links and in response to the afore-mentioned maintenance, operation, and other requests and the form of the redundant configuration of the physical link, even when a plurality of or a number of active links are provided in any of the links, the link on which the paths are provided can be efficiently and surely released, provided that the afore-mentioned auxiliary link is assigned under the system configuration.

The fifth principle of the node device according to the present invention will be described as follows.

The control section 11A individually selects a link on which the paths are to be provided, of all links provided to form respective paths arranged between communication devices 10-1 to 10-n accommodated into a local station and communication devices accommodated into a remote station. The cross-connection section 12A provide a path between the communication devices 10-1 to 10-n and the communication devices accommodated into the remote station through the link selected by the control section 11A among all links. The storage section 13A registers identifiers of the substitute links on which the respective substitute paths are to be provided in place of the paths, and not included in the group, of all paths provided in the links belonging to the group for every group of links to be released in parallel. When the instruction indicating the group of identifiers of the links to be released is give from the outside, the control section 11A prioritizes the substitute link for all paths by specifying all paths and all links indicated by the identifiers stored in the storage section 13A corresponding to the group.

In the node device, all paths corresponding to start and end points and to be replaced in response to maintenance, operation and other requests and auxiliary links into which substitute paths are to be provided are collectively assigned, and independently selected based on a row of identifiers of the links where the paths are provided.

Therefore, irrespective of the rate group of respective links and the number of paths to be replaced in response to the afore-mentioned maintenance, operation and other requests and whether or not configuration type of the physical links is redundant, even when a plurality of or a number of active links are provided in any of the links, the links on which the paths are provided are efficiently and surely released.

The sixth aspect of the node device according to the present invention will be described.

The links indicated by identifiers included in the instruction and to be released are all links on which the specific transmission sections are provided.

In the node device, all paths provided in the afore-mentioned specific transmission section are replaced with other paths provided in the substitute link on which the specific transmission sections are not included.

Therefore, the desired transmission sections can be smoothly and surely released.

The seventh aspect of the node device according to the present invention will be described.

The cross-connection sections 12, 12A defers updating paths provided in the link selected by the control sections 11, 11A.

In the node device, all paths provided in the substitute link with a purpose of releasing the specific transmission section or link in response to the maintenance, operation, and other requests are maintained without being replaced by another paths which are formed in another link, even when operation and other requests, even when obstacles, fluctuation in traffic distribution, congestion and other accidents occur.

Therefore, the afore-mentioned maintenance, operation, and other requests are prioritized so that the specific transmission section or link released in response to those request can be stably ensured.

The eighth aspect of the node device according to the present invention will be described.

The instruction refers to information transferred through a redundant transmission band of the link provided in the preceding transmission section.

In the node device, the afore-mentioned instruction can be given with certainty even when the dedicated communication link should not be established between the transmitting end and the relaying end of the instruction.

Therefore, compared to a case where the dedicated communication link is not established, simpler construction can be made with improved reliability and low-cost manufacturing.

The ninth aspect of the node device according to the present invention will be described.

The instruction refers to information transferred through the specific communication line different from any of the preceding transmission sections of the link connected to the cross-connection sections 12 and 12A.

In the node device, even when the transmitting end and the relaying end of the instruction do not exist in the region where the existing link is established, the afore-mentioned instruction can be given with certainty through the afore-mentioned specific communication link.

Therefore, a geographical restriction of the site for supervisory and control task for the maintenance and operation through the specific communication link are relieved so that various types of maintenance and operation can be flexibly applied.

The tenth aspect of the node device according to the present invention will be descried as below.

The instruction includes identifiers of the node device corresponding to the destination of the instruction.

The control sections 11 and 11A relay the instruction that does not correspond to the destination of the local station through the redundant transmission band of the transmission section in the following transmission section through the cross-connection sections 12 and 12A.

In the node device, the above-mentioned instruction is transferred to other node, which is the destination of the instruction, by taking advantage of the redundant transmission band of the link to be cross-connected.

Therefore, the simple construction can be obtained with improved reliability and low-cost manufacturing.

Figure 2:
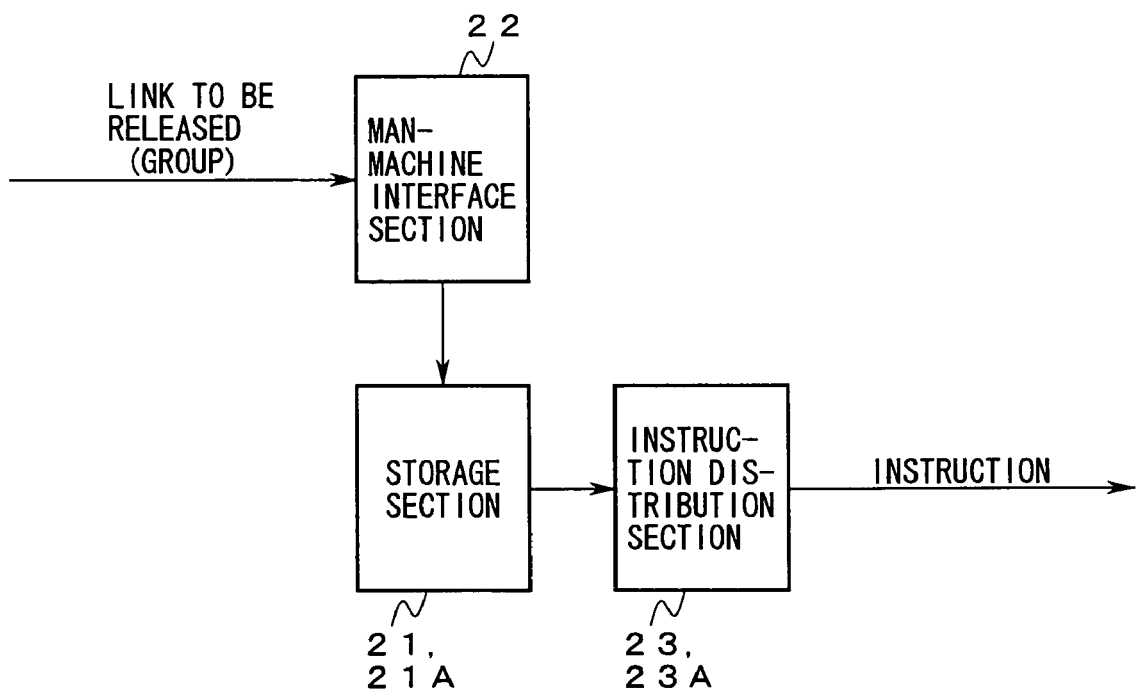
FIG. 2 is a maintenance and operation support device according to the present invention.

FIG. 2 is a block diagram for explaining operation of a maintenance and operation support device according to the present invention.

The maintenance and operation support device shown in FIG. 2 includes storage sections 21 and 21A, man machine interface section 22, and instruction distribution sections 23 and 23A.

Operation of the first aspect of the maintenance and operation support device according to the present invention is described as follows.

The storage section 21 registers in advance all paths provided in respective links and nodes arranged at both ends of the paths, of the nodes arranged in the network. The man machine interface section 22 provide man machine interface directed to the assignment of the link to be released. The instruction distribution section 23 distributes instructions including paths registered in the storage section 21 in addition to the node collectively, to the respective node destination registered in the storage section 21 corresponding to the link assigned through the man machine interface section 22.

The maintenance and operation support device informs, collectively, for respective nodes arranged at both ends of all paths provided in the link assigned through the man machine interface section 22, the substitute paths in place of all paths.

Therefore, compared to a case where a personnel should maintain and operate manually the respective instructions since the afore-mentioned instruction are transferred to the respective node destinations arranged at both ends of the paths, for every path, the task for releasing the desired transmission section and link can be efficiently performed with a less effort.

The second aspect of the maintenance and operation support device according to the present invention is described below.

The storage section 21A registers in advance all paths provided in respective links, substitute links on which substitute paths are to be provided in place of the paths, and nodes arranged at both ends of substitute paths, of the nodes arranged in the network. The man machine interface section 22 provide man machine interface directed to the assignment of the link to be released. The instruction distribution section 23A distributes instructions including paths registered in the storage section 21A and the substitute links in addition to the node collectively, to the respective node destination registered in the storage section 21A corresponding to the link assigned through the man machine interface section 22.

The maintenance and operation support device can collectively inform, for respective nodes traversing every path provided in the link assigned through the man machine interface section 22, all corresponding paths and the substitute paths in place of the paths.

Therefore, compared to a case where a personnel should maintain and operate manually the respective instructions since the afore-mentioned instruction are transferred to the respective node destinations arranged at both ends of the paths, for every path, the task directed to releasing the desired transmission section and link can be efficiently done with less effort.

The third aspect of the maintenance and operation support device according to the present invention is described below.

Since all links are duplicated, it is not necessary that even the node arranged at both ends of any sides of paths informs the link on which the substitute paths are to be provided in place of the corresponding paths, as long as the system configuration of the links are independently maintained for the respective nodes based on the duplication types of the respective links.

Therefore, irrespective of the number of the transmission section and link to be released and the configuration thereof, traffic increase accompanied by the afore-mentioned instruction distribution is relieved.

The fourth aspect of the maintenance and operation support device according to the present invention is described below.

The storage sections 21 and 21A register in advance, for every group appropriate to the network configuration, a link belonging to the group. The man machine interface section 22 identifies all links registered in the storage section 24 in response to the group assigned from the outside, as a link to be released.

In the maintenance and operation support device, the configuration of the line or transmission section to be released is assigned as a single group from the outside, provided that it is predetermined as the existing group.

Therefore, operation for assigning the afore-mentioned link or transmission section can be simplified and the task for the maintenance or operation can be efficiently done.

The fifth aspect of the maintenance and operation support device according to the present invention is described below.

The group refers to a one or both of the links and the transmission sections to be a task subject for maintenance and operation of the network.

In the maintenance and operation support device, the configuration of the transmission section or the link to be the afore-mentioned task subject is informed with certainty linked to the associated node without complicating the task for maintenance and operation, provided that it is predetermined as the existing group.

Therefore, various types of tasks for maintenance and operation can be flexibly adapted, and the task can be efficiently made.

Hereinafter, exemplary embodiments of the present invention will be described in detail with reference to the attached drawings.

Embodiment 1

Figure 3A:
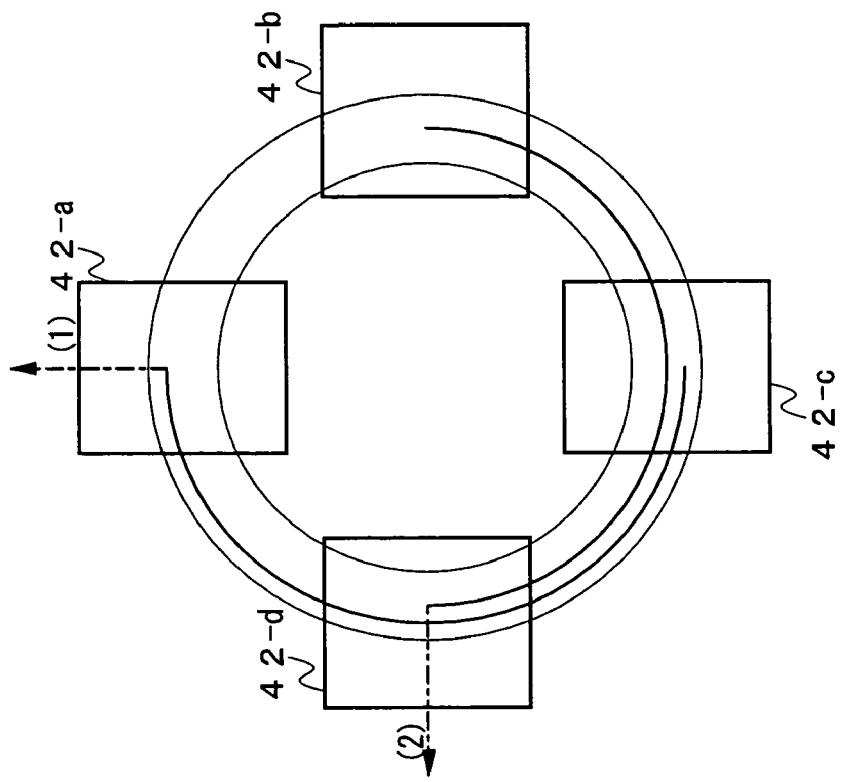
FIG. 3 is a diagram for explaining operation according to the first embodiment of the present invention.
Figure 3B:
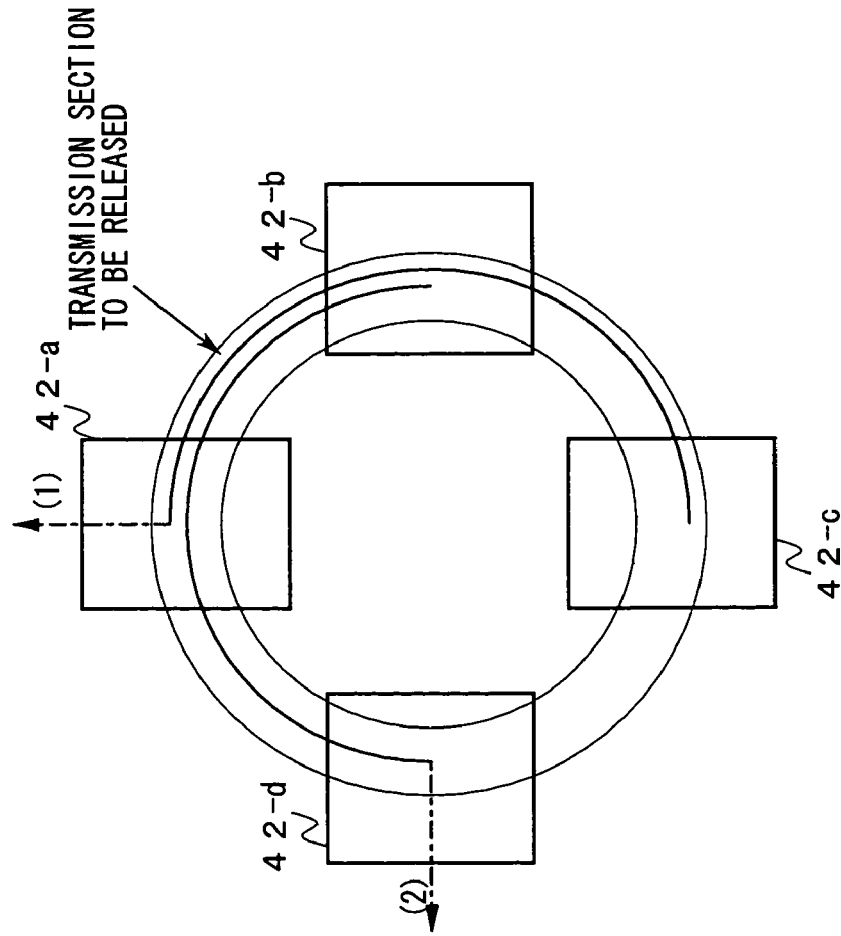

FIGS. 3a and 3b are diagrams for explaining operation of the first embodiment of the present invention.

Figure 4:
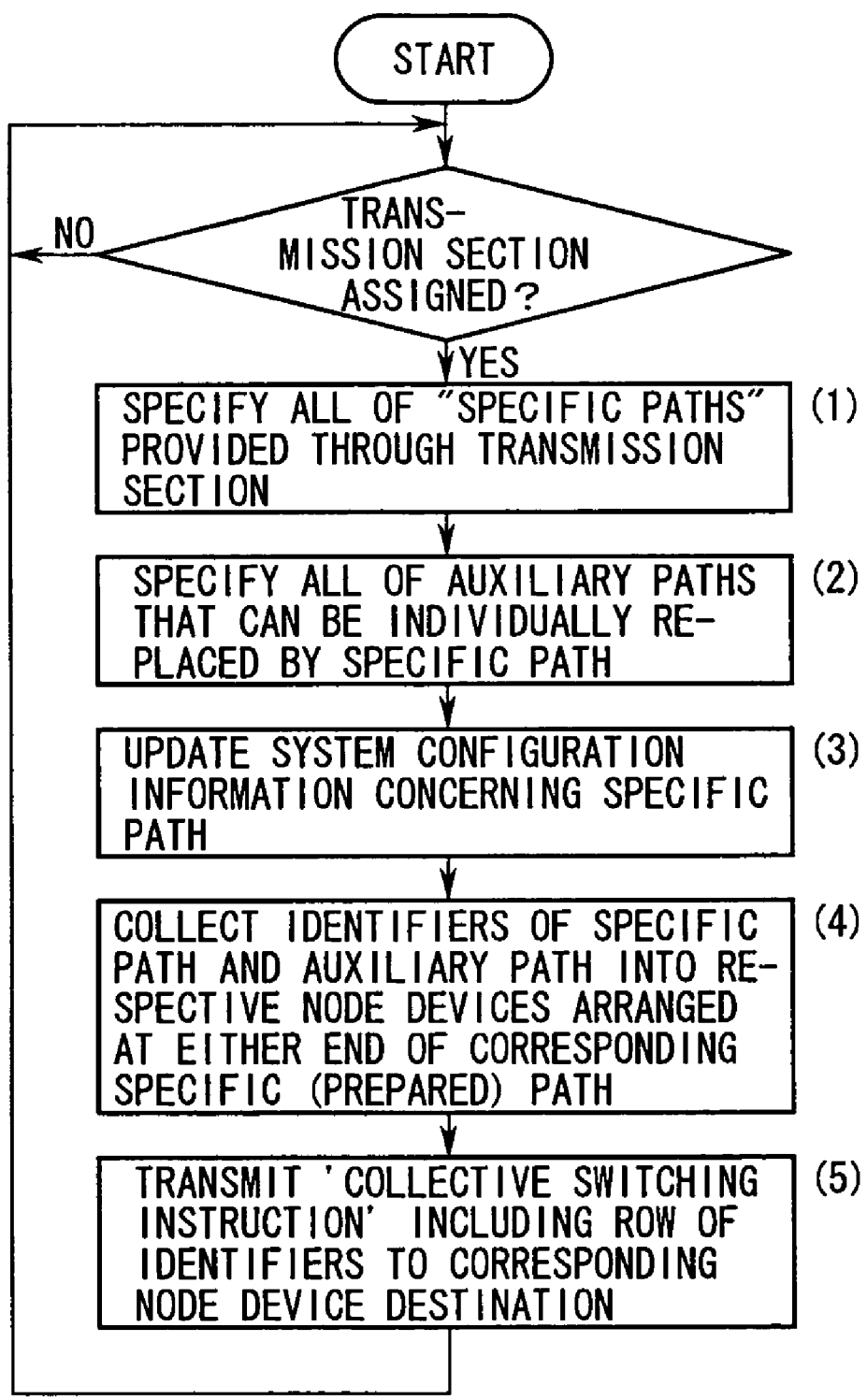
FIG. 4 is a flow chart for explaining operation according to the first embodiment of the present invention.

FIG. 4 is a flow chart for explaining operation of the first embodiment of the present invention.

Hereinafter, operation according to the first embodiment of the present invention will be described with reference to FIGS. 3a, 3b, 4 and 9.

The first embodiment is characterized in that the processing is performed using a supervisory and control device 51 shown in FIG. 9 and a supervisory and control unit 48-C prepared for the node device 42-C, as follows.

During the maintenance and operation, when the transmission section ab is to be released due to, for example, the extension of the node installation and the inspection subject, the supervisory and control device 51 performs the following processing.

When the transmission section ab is assigned as "the transmission section to be released" by the operator, all of the "specific paths" provided through the transmission section ab are specified (FIG. 4(1)).

An auxiliary path that can be individually replaced by the afore-mentioned specific path can be specified (FIG. 4(2)), and system configuration information concerning specific path is updated (FIG. 4(3)).

Identifiers of the specific path and the auxiliary path are collected into respective node devices arranged at either end of the corresponding specific (auxiliary) path (FIG. 4(4)).

A 'collective switching instruction' including a row of identifiers is transmitted to the corresponding node device destination via the LAN 52 one after another (FIG. 4(5))

Further, for the node device 42-C receiving the 'collective switching instruction', the supervisory and control unit 48-C instructs the path switch unit 45-C to replace the specific path indicated by the respective identifiers included in the 'collective switching instruction' with the corresponding auxiliary path.

In other words, identifiers of all of the specific paths provided in the transmission section ab in parallel and the substitute path in place of the specific paths are classified according to the corresponding node devices arranged at both ends of the respective specific paths (substitute paths) and collectively informed to the corresponding node device destinations as 'collective switching instruction', and at the same time, in the respective node devices, the specific paths represented as a pair of identifiers included in the 'collective switching instruction' collectively are replaced with the auxiliary paths.

According to the present embodiment, all of the specific paths provided in parallel in the transmission section ab (FIGS. 3a(1) and 3a(2)) is automatically replaced with the substitute appropriate paths (FIGS. 3b(1) and 3b(2)) without a basic change of the hardware configuration and a cumbersome manual task.

Therefore, irrespective of the rate group referring to a unit in which the path is to be provided, and the number of the specific paths to be replaced with the substitute paths, the desired transmission section can be released more efficiently and surely than the prior art.

Embodiment 2

Figure 5:
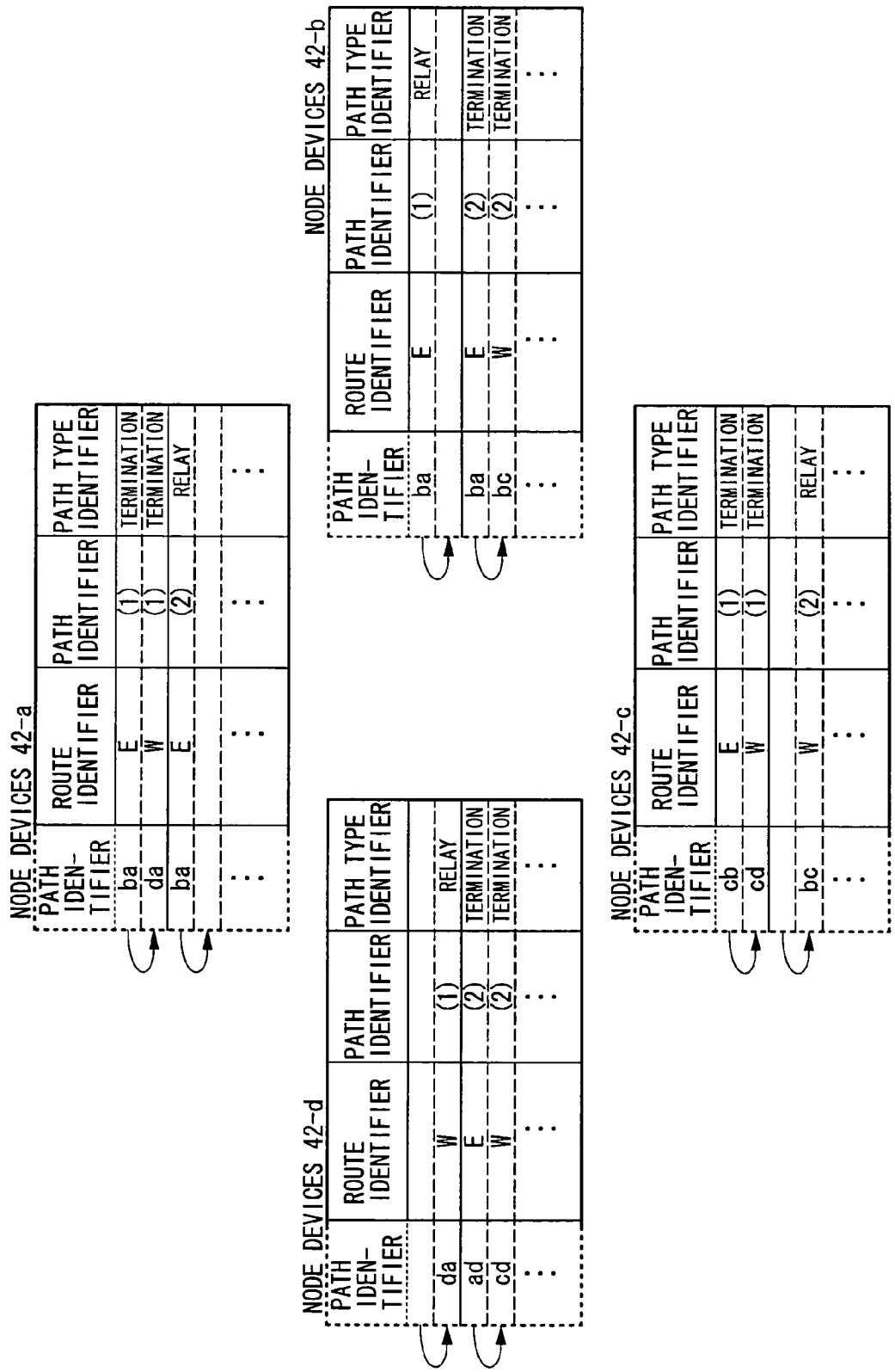
FIG. 5 is a diagram for explaining operation according to the second embodiment of the present invention.

FIG. 5 is a diagram for explaining operation of the second embodiment of the present invention.

Figure 6:
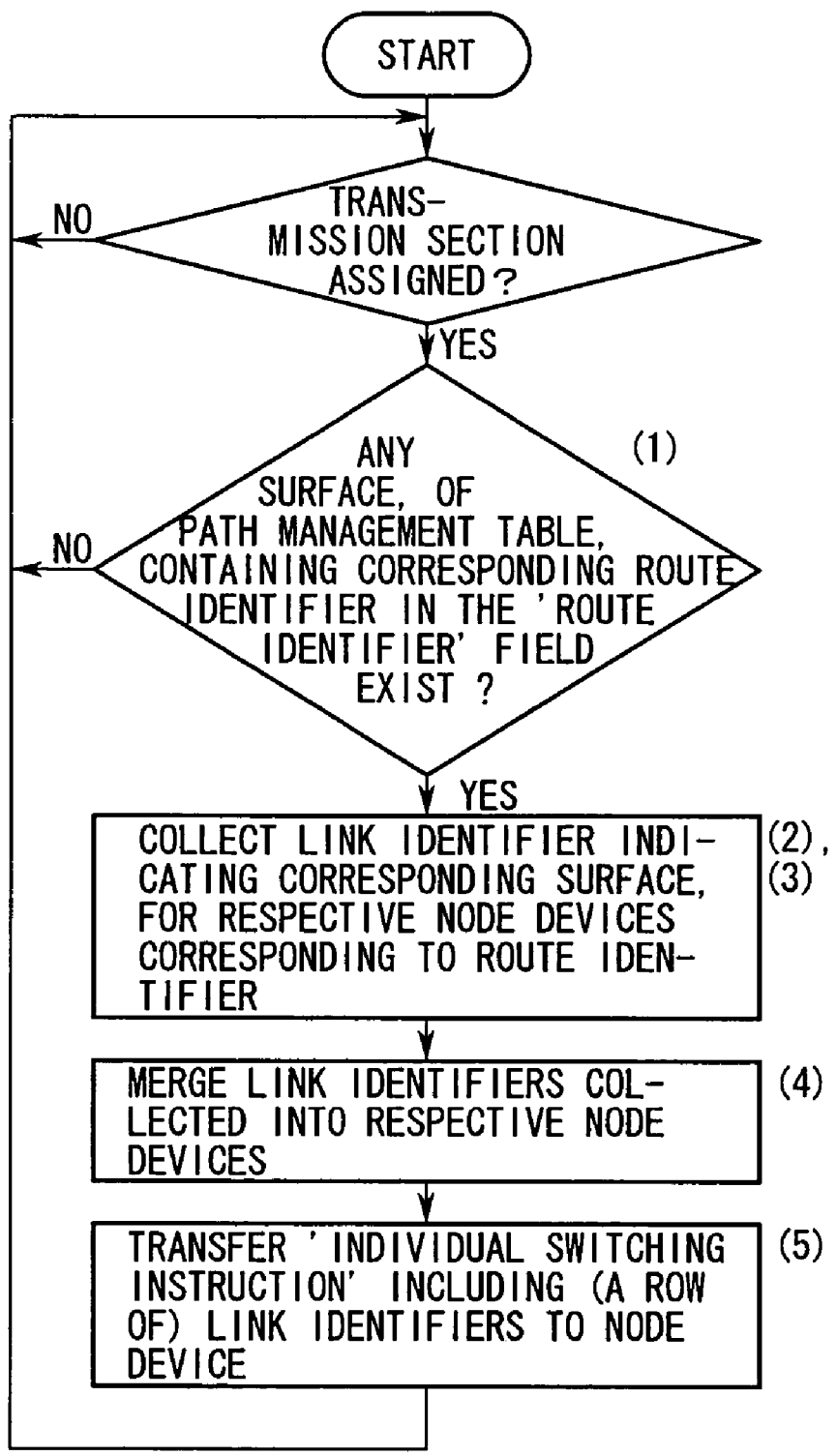
FIG. 6 is a flow chart for explaining operation according to the second embodiment of the present invention.

FIG. 6 is a flow chart for explaining operation of the second embodiment of the present invention.

Hereinafter, operation according to the second embodiment of the present invention will be described with reference to FIGS. 3a, 3b, 5, 6 and 9.

As shown in FIG. 7, the supervisory and control device 51 has an path management table 51t stored previously by a row of records arranged as a field group on the first and second surfaces respectively corresponding to a clockwise link, and a counter-clockwise link of the duplicated network 41.

A 'path identifier' field into which the unique path identifier is stored and is individually assigned to all paths corresponding to all of the paths provided to the link in parallel.

A 'route identifier' field having node identifiers that indicates the node device corresponding to each of start and end points indicated by the respective path identifiers (here, for brevity sake, additional characters 'a' to 'd' added to the numeral 42) at left and right ends, and storing route identifiers in which the node identifiers indicating the respective node devices arranged through the sequence of the route of the path between the node identifiers.

In addition, the supervisory and control unit 48-C included in the node device 42-C has a band management table 48t-C in which a row of records having a group of field as described below are stored in advance, on the surfaces respectively corresponding to the clockwise link and the counterclockwise link of the duplicated network, as shown in FIG. 8.

A 'transmission section identifier' field individually provided at the afore-mentioned clockwise link and the counterclockwise link, and at the transmission section immediately next to the corresponding link, for storing the unique transmission section identifiers (hereinafter, for brevity sake, it is assumed that identifiers of the two node devices arranged at both sides of the corresponding transmission section are indicated by the sequence of the transmission direction of the link).

A 'path identifier' field for storing unique path identifiers corresponding to the respective paths where the node device 42-C corresponding any of the start point, end point, and middle point A 'path type identifier' field for storing a path type that indicates how the afore-mentioned node device 42-C is arranged at the afore-mentioned start point, middle point, and end point, (one of 'relay' and 'termination') for the corresponding path A 'property' field for storing the unique property at the corresponding path Here, during the maintenance and operation, for example, when the transmission section ab is released due to the extension of the node installment and the inspection subject, the supervisory and control device 51 performs the following processing.

When the operator assigns the transmission section ab as a 'transmission section to be released', it is determined whether there exist records on the first surface containing a character string 'ab' in the 'route identifier' field (row of node identifier) and records on the second surface containing a character string 'ba' in the 'route identifier' field, of the surface of the path management table 51t (FIG. 6(1)).

When it is determined that there exist the records on the first surface, the unique link identifiers (here, for brevity sake, indicated by W that refers to the afore-mentioned 'clockwise link') indicating a link corresponding to the first surface are collected, for the respective node devices corresponding to the characters (any of 'a' to 'd') arranged at either side of top and bottom values of all 'route identifier' field including the afore-mentioned character string 'ab', of the 'route identifier' field of the records on the first surface (FIG. 6(2))

In the same manner, when it is determined that there exist the records on the second surface, the unique link identifiers (here, for brevity sake, indicated by E that refers to the afore-mentioned 'counterclockwise link') indicating a link corresponding to the second surface are collected, for the respective node devices corresponding to the characters (any of 'a' to 'd') arranged at either side of top and bottom values of all 'route identifier' field including the afore-mentioned character string 'ba', of the 'route identifier' field of all records on the second surface (FIG. 6(3)).

The link identifiers collected as described above are merged into the respective node devices (FIG. 6(4)), and to the 'individual switching instruction' including the resulting (a row of) link identifiers (FIG. 6(5)) is transferred to the node device destinations.

Further, in the node device 42-a (42-b), when the afore-mentioned 'individual switching instructions' are received, the supervisory and control unit 48-a (48-b) performs the following processing with reference to the respective surfaces corresponding to the link identifiers included in the 'individual switching instructions' of the surface of the band management table 48*t-a* (48*t-b*)

Of the records included in the corresponding surfaces of the band management table 48*t-a* (48*t-b*), the value of the 'path type' field indicates the 'termination' (the afore-mentioned 'start points' or 'end points'), or the substitute restriction by the auxiliary path described below takes the specific path as the row of the value of the 'path identifier' field of all records not defined, as the value of the 'property' field (e.g., 'lock out property' etc.).

For all of the specific paths, path replaced with the corresponding auxiliary paths is instructed to the path switching unit 45-*a* (45-*b*) one after another.

For the specific path where the replacement with the auxiliary path is completed, as shown in FIG. 5 in arrows matched to FIGS. 3*a* and 3*b*, matching of the corresponding surface and records of the band management table 48*t-a* (48*t-b*) are attempted, and further, based on algorithm that can be determined in advance or the predetermined control information added to the afore-mentioned 'individual switching instructions', the new property (e.g., the afore-mentioned 'lockout property') in the corresponding 'property' field is set and the property that was set earlier in the 'property' field is updated.

The series of processing results are matched, and information required in updating the afore-mentioned system configuration information is generated, and the information is transferred to the supervisory and control device 51 through the LAN 52.

In other words, the afore-mentioned 'individual switching instruction' includes the link identifiers only for the links having the specific path to be replaced by the auxiliary path without repetition, and the 'individual switching instruction' is given only to the node device arranged at both ends of the respective paths provided through the transmission section ab to be released.

In addition, the node device receiving the 'individual switching instruction' independently replaces the path in which the local station is the start point and end point with the auxiliary path, by referring to the band management table 48*t*-C arranged respectively.

Therefore, according to the present invention, even when a plurality of (a number of) paths can be provided in any of the links, the desired transmission section can be efficiently and surely released.

In addition, according to the afore-mentioned embodiments, the network 41 may be configured with UPSR based on SDH, SONET (Synchronous Optical Network), in a ring type, and is constructed with a duplicated link having two transmissions with two opposite directions.

However, the present invention is not limited to the network 41 described above, and the substitute paths and links can be properly provided based on the system configuration, and provided that synchronous transfer mode (STM) is adapted, the network configured in a certain digital hierarchy, topology and the redundant configuration can also be used in the same manner.

In addition, according to the afore-mentioned embodiments, even for the active path provided through any of the transmission section to be released, the path switch 45-C operated by the supervisory and control unit 48-C replace the active path with the auxiliary path.

However, the present invention is not limited hereto, and for example, when all or a part of the transmission sections arranged between the node devices 42-*a* to 42-*d* has more than three physical links (transmission path) established, the active path can be replaced by the auxiliary path in the same manner, under the cross-connector unit 44-C operated by the supervisory and control unit 48-C or under the cross-connector unit 44-C and the path switch 45-C operated by the supervisory and control unit 48-C.

In addition, when the network 41 is redundantly configured based on three more physical links, for example, the supervisory and control 51 largely process the processing in connection with the system configuration of the network 41, and as shown in dotted line in FIG. 7, the substitute link identifier indicating the substitute link selected under the system configuration is properly stored into the path management table 51, and moreover, the substitute link identifier is attached to the afore-mentioned 'individual switching instruction' and transferred to the respective node devices so that the respective active paths can be replaced by the auxiliary path, under the cross-connector unit 44-C operated by the supervisory and control unit 48-C or under the cross-connector unit 44-C and the path switch 45-C operated by the supervisory and control unit 48-C, as described above.

In addition, according to the embodiments of the present invention, the network 41 is configured in the afore-mentioned UPSR or redundantly configured based on the active redundant configuration.

However, all or a part of the link included in the network 41 may be configured in bidirectional line switched ring (BLSR).

In addition, according to the embodiments of the present invention, the afore-mentioned 'collective switching instruction', 'individual switching instruction' and other control information between the node devices 42-*a* to 42-*d* and the supervisory and control device 51 are directly transferred to each other through the LAN 52.

However, the present invention is not limited hereto, and for example, when only a single node device (hereinafter, referred to as 'specific node device') out of one of the node devices 42-*a* to 42-*d* is connected to the LAN 52, the afore-mentioned control information between the node devices other than the specific node device and the supervisory and control device 51 can be transmitted by a relaying process performed by the node devices 42-*a* to 42-*d* through a redundant transmission band of the transmission section provided between the node devices 42-*a* to 42-*d* (the predetermined field of overhead appropriate to the existing frame configuration, a vacant time lot and tributary unit and any other type any of which a traffic can not be allocated can be used).

In addition, according to the embodiments of the present invention, with a purpose of releasing the overall desired transmission section, all active paths provided through the transmission section can be efficiently and surely replaced with the auxiliary paths.

However, the present invention is not limited to the overall releasing of the transmission section, so that, for example, during the maintenance and operation, the specific link (either single link or multiple links can be used) arranged at the desired transmission section (either single transmission section or multiple transmission sections can be used) can also be released.

In addition, according to the embodiments of the present invention, the supervisory and control device 51 is provided as a separate device connected to the node devices 42-*a* to 42-*d* through the LAN 52.

However, the present invention is not limited hereto, the supervisory and control device 51 can be embodied to any of the node devices 42-3 to 42-*d* and a function distribution or load sharing can be made in the node devices 42-*a* to 42-*d* suitable for the maintenance and operation.

The invention is not limited to the above embodiments and various modifications may be made without departing from the spirit and scope of the invention. Any improvement may be made in part or all of the components.

What is claimed is:

1. A node device which cross-connects a plurality of links to which respective link identifiers are added in a synchronous transfer mode (STM) transmission system, comprising:
   a control section individually selecting a link, of all the links provided to form respective paths between a communication device accommodated in a local station and a communication device accommodated in a remote station, the respective paths being formed in the selected link;
   a cross-connection section forming the path between said communication device accommodated in said local station and said communication device accommodated in said remote station through the link selected by said control section, of said all links; and
   a storage section storing information of a transmission section identifier indicating a transmission section to which the local station corresponds, a path identifier indicating a path to which the transmission section identifier corresponds, and a path type identifier indicating a path type of the local station in the path indicated by the path identifier, and registering by associating the transmission section identifier, the path identifier, and the path type identifier for each of link identifiers so to specify, for a link identifier allowed to be released, link identifiers of substitute links corresponding to all path identifiers belonging to the link identifier allowed to be released, wherein
   when an instruction indicating link identifiers of the link to be released is given from a man machine interface section in a maintenance and operation support device, said control section specifies the link identifiers of the substitute links corresponding to all paths indicated by the path identifiers registered in said storage section and corresponding to the link identifiers of the link to be released, and collectively selects the substitute links indicated by the link identifiers being specified for all of the paths.

2. The node device as set forth in claim 1, wherein:
   said instruction includes an identifier of the node device corresponding to a destination of the instruction; and
   said control section relays the instruction of which a destination does not correspond to the local station through a redundant transmission band of the following transmission section via said cross-connection section.

* * * * *